US006842866B2

(12) United States Patent
Song et al.

(10) Patent No.: US 6,842,866 B2
(45) Date of Patent: Jan. 11, 2005

(54) METHOD AND SYSTEM FOR ANALYZING BITMAP TEST DATA

(76) Inventors: Xin Song, 1702 Stearns Hill Rd., Waltham, MA (US) 02451; Stewart Hitelman, 8 Forrest Rd., Westford, MA (US) 01886; Chin-Jung Hsu, 137 Bridges La., North Andover, MA (US) 01845

( * ) Notice: Subject to any disclaimer, the term of this patent is extended or adjusted under 35 U.S.C. 154(b) by 247 days.

(21) Appl. No.: 10/281,398

(22) Filed: Oct. 25, 2002

(65) Prior Publication Data

US 2004/0083407 A1 Apr. 29, 2004

(51) Int. Cl.[7] .................. G06F 11/00; G06F 17/50; G11C 29/00
(52) U.S. Cl. .................. 714/37; 714/25; 714/42; 714/718; 714/719; 714/720; 365/200; 365/201; 716/4
(58) Field of Search .................. 714/25, 37, 42, 714/718–720; 365/200, 201; 716/4

(56) References Cited

U.S. PATENT DOCUMENTS

| | | | | |
|---|---|---|---|---|
| 4,736,373 A | * | 4/1988 | Schmidt | 714/711 |
| 4,876,685 A | * | 10/1989 | Rich | 714/723 |
| 5,588,115 A | * | 12/1996 | Augarten | 714/29 |
| 5,631,868 A | * | 5/1997 | Termullo et al. | 365/200 |
| 5,720,031 A | * | 2/1998 | Lindsay | 714/42 |
| 5,946,214 A | | 8/1999 | Heavlin et al. | |
| 6,091,846 A | * | 7/2000 | Lin et al. | 382/145 |
| 6,185,707 B1 | | 2/2001 | Smith et al. | |
| 6,330,693 B1 | | 12/2001 | Lindsay | |

* cited by examiner

Primary Examiner—Robert Beausoliel
Assistant Examiner—Emerson Puente
(74) Attorney, Agent, or Firm—Kriegsman & Kriessman

(57) ABSTRACT

A system for analyzing bitmap test data includes a fault shape analyzer which continuously and automatically receives bitmap test data. In use, the user creates at least one failure pattern analysis order to be performed by the fault shape analyzer, the order specifying a particular failure pattern to be identified. Based on the order, the fault shape analyzer creates a bitmap display of a user-specified sector using selected bitmap test data. The fault shape analyzer identifies the user-specified failure pattern in the bitmap display by multiplying, at various locations, the bitmap display in the frequency domain and the failure pattern in the frequency domain. A comparison between the product of the multiplication process and the failure pattern is performed to locate failure patterns in the bitmap display. Failure patterns identified from the comparison process are saved as defect files which, in turn, are stored in a failure pattern classification database.

20 Claims, 10 Drawing Sheets

  
*FIG. 2(a)*   *FIG. 2(b)*   *FIG. 2(c)*
 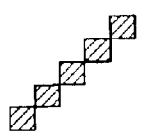 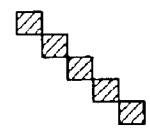
*FIG. 2(d)*   *FIG. 2(e)*   *FIG. 2(f)*
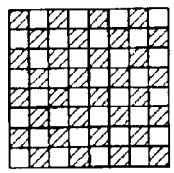 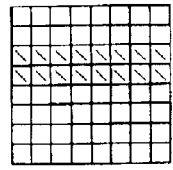 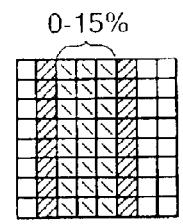
*FIG. 3(a)*   *FIG. 3(b)*   *FIG. 3(c)*
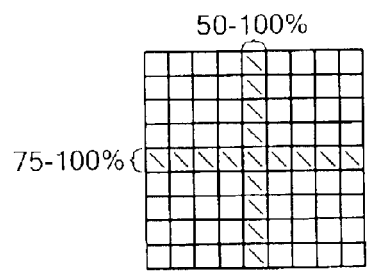 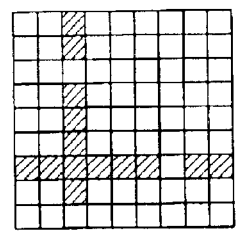 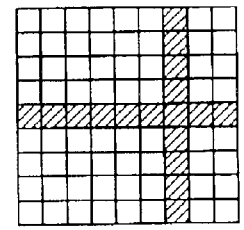
*FIG. 4(a)*   *FIG. 4(b)*   *FIG. 4(c)* upper bound ($\beta$) = 4
lower bound ($\alpha$) = 3
| 1 | 1 | 1 |
|---|---|---|
| 1 | 1 | 1 |
| 1 | 1 | 1 |
↖ $Y_{i,j}$
| 0 | 1 | 0 | 0 | 0 |
|---|---|---|---|---|
| 1 | 0 | 0 | 0 | 0 |
| 0 | 0 | 1 | 1 | 0 |
| 0 | 0 | 0 | 0 | 1 |
↖ $X_{i,j}$
| 2 | 2 | 1 | 0 | 0 |
|---|---|---|---|---|
| 2 | 3 | 3 | 2 | 1 |
| 1 | 2 | 2 | 3 | 2 |
| 0 | 1 | 2 | 3 | 2 |
↖ Z
FIG. 11
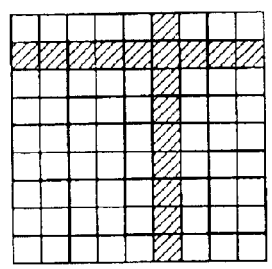
FIG. 13(a)
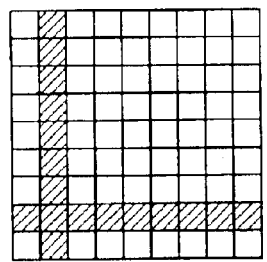
FIG. 13(b)
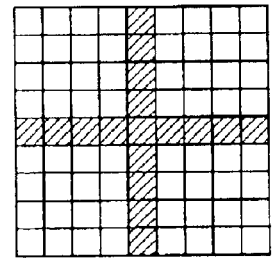
FIG. 13(c)

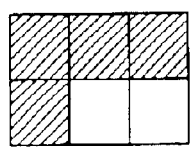 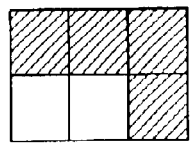 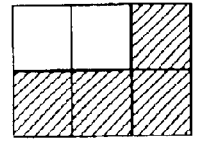
*FIG. 14(a)*   *FIG. 14(b)*   *FIG. 14(c)*
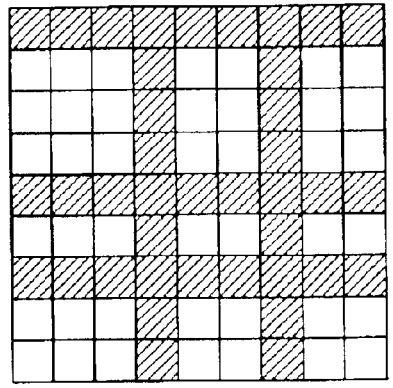
*FIG. 15*

METHOD AND SYSTEM FOR ANALYZING BITMAP TEST DATA

BACKGROUND OF THE INVENTION

The present invention relates to a novel method and system for analyzing semiconductor bitmap test data.

Integrated circuits (ICs) are commonly manufactured through a series of processing steps. Very often more than a hundred processing steps are performed to produce a properly functioning integrated circuit chip.

A semiconductor material, commonly in the shape of a wafer, serves as the substrate for integrated circuits. Semiconductor ICs are typically manufactured as an assembly of a hundred or more chips on a single semiconductor wafer which is then cut up to produce the individual IC chips. Typically, a wafer made of silicon is used as the integrated circuit substrate, the silicon wafer being approximately 150–300 mm in diameter and 0.6–1 mm thick. During the manufacturing process, the silicon wafer is first polished and cleaned to remove all contaminant particles situated thereon. The silicon wafer is then treated in preparation for a series of processing steps involving a plurality of photolithographic patterns (also commonly referred to as masks). In the production of integrated circuits, microelectronic circuits are formed onto the silicon wafer through a process of layering. In the layering process, conductive and insulative layers of thin films are deposited and patterned onto the silicon wafer. Each layer is patterned by a mask designed specifically for it, the mask defining the areas within the wafer that are to be treated such as by etching or implanting.

Semiconductor fabrication technology today deals with silicon wafers which are approximately 200 mm in diameter and which feature geometries with dimensions well below 0.5 $\mu$m (micrometer). Due to the high complexity and level of integration of integrated circuits, the absence of processed induced defects on every layer of the wafer is critical in order to realize acceptable levels of product yield. Specifically, the presence of one processed induced defect larger than the half the width of a conductive line on the silicon wafer can result in the complete failure of a semiconductor chip produced from the wafer. Such a chip has to be discarded which thereby decreases the percentage yield per wafer and increases the overall cost of the individual wafers. Therefore, a critical task facing semiconductor process engineers is to identify and, as soon as possible, to eliminate sources of processed induced defects on each layer of a semiconductor wafer.

Accordingly, memory devices (e.g., DRAM, SRAM and FLASH memory devices) and logic devices which include integrated circuits manufactured from a semiconductor wafer require production monitoring and testing. The results generated from semiconductor wafer monitoring and testing are then used during a failure analysis process to more accurately treat problems introduced into the integrated circuits, as will be discussed further below.

Memory chips, because of their structure as coordinated arrays of memory cells, readily lend themselves to failure analysis. As a result, each integrated circuit formed on a semiconductor wafer is tested before the integrated circuit is packaged as a memory device. Specifically, electrical probes connected to a test station contact pads on the integrated circuit to monitor the functionality of the individual cells of a memory device.

As an example, a memory device can be tested by disposing the electrical probes into contact with address pads on the integrated circuit in order to access selected memory cells for the memory device. A predetermined set or pattern of test data is written into selected addresses that correspond to certain memory cells in the memory device. The test data is then read from those memory cells to determine if the test data, as read, matches the test data, as written. If the test data, as read, does not match the test data, as written, a semiconductor failure analysis engineer often deduces that the particular memory cells corresponding to the selected addresses are faulty.

Automatic test equipment (often referred to simply as ATE or testers in the art) are well known and are widely used to test individual memory cells of a memory device. The test data generated by automatic test equipment, in turn, can be used to identify the physical addresses (i.e., the row and column) of the faulty memory cells of a memory device. The individual memory cells, or bits, of a memory device are then often mapped into a bitmap display to assist in the identification of the faulty cells.

A bitmap display is a representation which provides the functional test results of each memory cell of a memory device and, in turn, provides a physical location array. Specifically, a bitmap display generates the test data accumulated by the automatic test equipment for a memory device as a matrix of square boxes. Each box represents an individual memory cell, the boxes often being arranged in direct relation to the physical location of the memory cells on the die. Each box of the matrix is often assigned a numerical value or color based on the performance of its corresponding cell during the testing process. For example, a properly functioning cell is often represented as a white box and a faulty cell is often represented as a black box.

Using a bitmap display, a semiconductor failure analysis engineer often examines faulty memory cells using a high intensity microscope to determine the reason for the errors (e.g., whether the errors occurred from masking defects, during deposition of certain layers, etc.). However, due to the large quantity of faulty memory cells which can be present on a single integrated circuit, individually examining each faulty memory cell under a high intensity microscope is often deemed too time-consuming.

Accordingly, the faulty cells of a bitmap display are often grouped into certain fundamental, or base, failure patterns (e.g., a block pattern failure, a column failure or a row failure). Failure patterns (also referred to herein as fault shapes) enable a failure analysis engineer to cluster together multiple faulty cells for further analysis, thereby reducing the overall amount of time required to examine the faulty cells of a memory device, which is highly desirable.

It should be noted that the particular shape of a failure pattern can often enable a failure analysis engineer to identify the root cause of the failure and/or estimate where in the production process the failure was introduced, which is highly desirable. Having identified where in the production process the failure occurred, the failure analysis engineer can attempt to clean up the manufacturing process to prevent further failures. In addition, the failed memory cells may be repaired by re-mapping the failed memory cells to redundant cells in the die.

Conventional methods for identifying fault shapes in bitmap displays apply a failure pattern mask at every position of the bitmap matrix in the spacial domain in order to locate particular failure patterns. The process of matching the pattern mask onto the bitmap display is typically accomplished through a bit by bit match of the pattern mask onto the bitmap matrix. The existence of a direct match signifies the identification of the pattern mask in the bitmap display at said location in the bitmap matrix. The identified failure pattern is then saved for future analysis by an engineer.

Although well known and widely used in the art, the conventional method of identifying fault shapes in bitmap displays by performing a bit by bit match of the pattern mask at every position of the bitmap matrix in the spatial domain suffers from a notable drawback. Specifically, the process of performing a bit by bit match of the two matrixes in the spatial domain requires the implementation of algorithms which are highly complex in nature. As a result, the process of performing the bit by bit match of the pattern mask in the spatial domain and the bitmap matrix in the spatial domain significantly slows down the entire analysis process, which is highly undesirable. In fact, the bitmaps generated for a single semiconductor wafer can require up to 24 hours to analyze using conventional analyzation methods, which is highly undesirable.

SUMMARY OF THE INVENTION

It is an object of the present invention to provide a method and system for analyzing bitmap test data.

It is another object of the present invention to provide a method and system as described above which converts bitmap test data into a bitmap display.

It is yet another object of the present invention to provide a method and system as described above which identifies failure patterns in said bitmap display.

It is still another object of the present invention to provide a method and system as described above which identifies failure patterns in said bitmap display using computer-implemented algorithms.

It is yet still another object of the present invention to provide a method and system as described above which identifies failure patterns in said bitmap display using computer-implemented algorithms which are relatively efficient and simple in nature.

Accordingly, as a feature of the present invention, there is provided a method for analyzing bitmap test data, said method comprising the steps of establishing a first failure pattern analysis order to be performed, the first failure pattern analysis order specifying a particular failure pattern to be identified, the failure pattern having at least one base fault shape, converting said bitmap test data into a bitmap display based on the first failure pattern analysis order, and identifying in the frequency domain the failure pattern of the first failure pattern analysis order in said bitmap display.

Various other features and advantages will appear from the description to follow. In the description, reference is made to the accompanying drawings which form a part thereof, and in which is shown by way of illustration, a specific embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIGS. 2(a)–(f) depict a plurality of base fault shape examples which may be used to form the user-specified failure pattern to be searched for by the system of FIG. 1;

FIGS. 3(a)–(c) depict a plurality of complex fault shapes which may be formed by combining two or more of the base fault shapes shown in FIGS. 2(a)–(f);

FIGS. 4(a)–(c) depict a plurality of decoupled fault shape examples which may be used to form the user-specified failure pattern to be searched for by the system of FIG. 1;

FIG. 11 is an example of a pattern mask definition and a bitmap matrix which can be matched together using the method of FIG. 10, the convolution product of the pattern mask definition and the bitmap matrix also being shown, each bit of the pattern mask definition and the bitmap matrix being assigned a numerical value according to the functionality of said bit;

FIGS. 13(a)–(c) depict a plurality of equivalent decoupled fault shapes;

FIGS. 14(a)–(c) depict a plurality of equivalent decoupled fault shapes; and

FIG. 15 depicts a bitmap matrix which includes a plurality of decoupled patterns shown in FIG. 13(a).

DETAILED DESCRIPTION OF THE PREFERRED EMBODIMENT SYSTEM FOR ANALYZING A BITMAP DISPLAY

Figure 1:
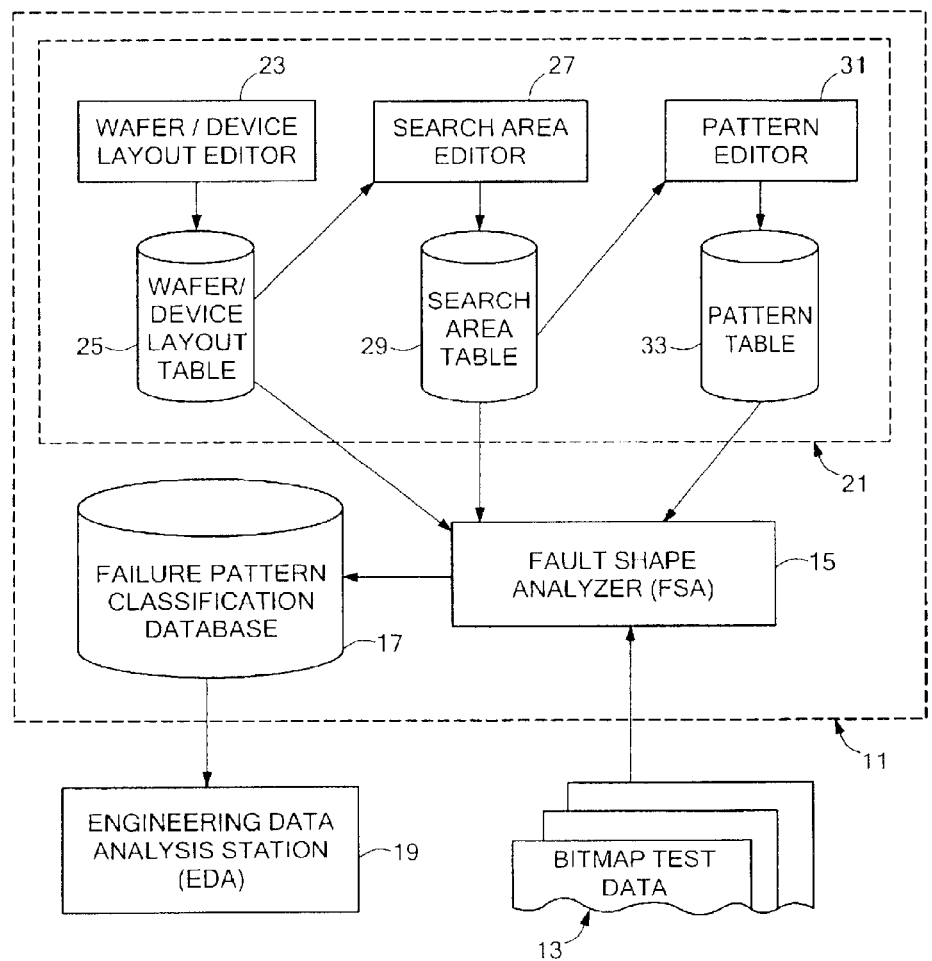
FIG. 1 is a block diagram of system for analyzing a bitmap display for a user-specified failure pattern, constructed according to the teachings of the present invention.

Referring now to FIG. 1, there is shown a block diagram of a system for analyzing a bitmap display generated for a memory device formed on a semiconductor wafer, the system being constructed according to the teachings of the present invention and identified generally by reference numeral 11. As will be described further in detail below, system 11 can be used to locate user-defined failure patterns within a sub-array of memory cells for a particular memory device. In turn, the detected failure patterns can be examined by a failure analysis engineer to identify the cause of the faulty memory cells, which is highly desirable.

System 11 functions in the following manner to analyze a bitmap display generated for a memory device. Automatic test equipment (ATE), commonly referred to simply as testers in the art, continuously perform bitmap tests on semiconductor wafers. Each semiconductor wafer typically comprises a plurality of dies (e.g., in the order of 300–500), each die having one or more memory devices (e.g., a DRAM, SRAM, FLASH memory, or cache in a CPU). The bitmap tests performed by the automatic test equipment provides a functional test result (i.e., pass or fail result) for each memory cell, or bit, of each memory device. The raw data accumulated from the bitmap tests are stored as bitmap test data 13, wherein multiple sets of bitmap test data 13 would be generated for each memory device tested.

The bitmap test data 13 generated from the automatic test equipment are uploaded into a fault shape analyzer 15. In particular, bitmap test data 13 are continuously and automatically uploaded into fault shape analyzer 15.

Fault shape analyzer (FSA) 15 is a computer system which performs the main process of identifying user-defined failure patterns within a particular sub-array of memory cells of a particular memory device. As will be described further below, fault shape analyzer 15 identifies user-defined failure patterns within a particular sub-array of memory cells of a particular memory device using the particular bitmap test data 13 which correspond to the particular sub-array. After having identified a user-defined failure pattern within a particular sub-array, fault shape analyzer 15 saves the identification and classification information relating to said failure pattern as a defect file and then downloads said defect file into a failure pattern classification database 17.

The particular failure pattern information (i.e., the defect files) stored within database 17 can be accessed for analysis by the user through an engineering data analysis (EDA) station 19. Engineering data analysis station 19 is a computer system which provides a graphical user interface for retrieving and analyzing defect files stored within database 17. EDA station 19 preferably includes software which allows the user to view the failure data in a variety of useful formats (e.g., charts).

In order for the fault shape analyzer 15 to identify user-defined failure patterns within a particular sub-array of a memory device, the user must initially submit one or more fault shape analysis orders to be performed by fault shape analyzer 15, each fault shape analysis order providing FSA 15 with the particular type of fault shape information that the user wants FSA 15 to perform. Accordingly, a system set-up graphical user interface 21 is provided to enable the user to submit the particular fault shape analysis orders to be performed by fault shape analyzer 15.

Set-up interface 21 comprises a wafer/device layout editor 23 which enables the user to specify the particular wafer/device layout to be analyzed by fault shape analyzer 15 for each fault shape analysis order. The particular wafer/device layout identified by the user using wafer/device layout editor 23 is downloaded into a wafer/device layout table 25.

Set-up interface 21 also comprises a search area editor 27 which extracts pertinent information from wafer/device layout table 25 and further pinpoints the particular sub-array, or sector, within a memory device on the wafer which is to be analyzed by fault shape analyzer 15 for each fault shape analysis order. The particular sub-array definition specified by the user using search area editor 27 is downloaded into a search area table 29.

Set-up interface 21 further comprises a pattern editor 31 which extracts pertinent information from search area table 29 and further specifies the specific type of failure pattern to be located within the specified sub-array by fault shape analyzer 15 for each fault shape analysis order. The specific type of failure pattern specified by the user using pattern editor 31 is downloaded into a pattern table 33.

It should be noted that the particular varieties of failure patterns to be searched for by fault shape analyzer 15 can be grouped into various useful categories.

As an example, the failure patterns can be grouped into a set of base (foundation) shapes, as defined by the user, which serve as the building blocks for all the failure patterns to be input through pattern editor 31. Specifically, referring now to FIGS. 2(a)–(f), there are shown a plurality of base shape examples which may be used to form the various user-defined failure patterns. The base shapes may be in the form of a single bit, as shown in FIG. 2(a), a row, as shown in FIG. 2(b), a column, as shown in FIG. 2(c), a block, as shown in FIG. 2(d), a forward diagonal, as shown in FIG. 2(e) and a backward diagonal, as shown in FIG. 2(f).

As another example, the user-specified failure patterns can be grouped according to the particular functional characteristics of the bits in the pattern. Specifically, the user-specified failure patterns can be grouped as either a deterministic failure pattern or a non-deterministic failure pattern. A deterministic failure pattern identifies each bit in the pattern as either a functionally passed bit (the passed bit being represented herein by a white box in the display) or a functionally failed bit (the failed bit being represented herein by a white box with solid diagonal lines in the display). To the contrary, a non-deterministic failure pattern identifies a group of bits in the pattern with a user-defined range (or percentage) of failed (or passed) bits within said group (each bit of a non-deterministic failure pattern being represented herein by a white box with dashed diagonal lines in the display). As can be appreciated, a non-deterministic failure pattern enables a large variety of deterministic patterns to be represented by a single non-deterministic pattern, thereby simplifying the fault shape identification process, which is highly desirable. For example, a 1024-bit row with specified failure rates between 50% and 100% failure rates can either be represented with a single non-deterministic failure pattern or approximately $$\sum_{i=512}^{1024} C_{1024}^{i}$$

deterministic failure patterns (which cannot be enumerated practically).

As another example, the user-specified failure patterns can be grouped into a set of complex fault shapes, each complex fault shape comprising at least one base fault shape and each complex fault shape being deterministic, non-deterministic or a combination thereof. Specifically, referring now to FIGS. 3(a)–(c), there are shown a plurality of complex failure pattern examples. The complex fault shapes may be in the form of a deterministic, checker board pattern, as shown in FIG. 3(a), a pattern comprising a pair of adjacent, non-deterministic rows having a failure rate between 15% and 80%, as shown in FIG. 3(b) and a pattern comprising a pair of deterministic columns separated by three adjacent, non-deterministic columns having a failure rate between 0% and 15%, as shown in FIG. 3(c).

As another example, the user-specified failure patterns can be additionally grouped as decoupled fault shapes (each decoupled fault shape including multiple base shapes). A decoupled fault shape has a unique characteristic. Specifically, within each decoupled fault shape definition, each base shape within the pattern can be displaced relative to any other base shape. For example, FIG. 4(a) shows a decoupled base pattern which includes a non-deterministic column having a failure rate between 50% and 100% and a non-deterministic row having a failure rate between 75% and 100%. The decoupled base pattern shown in FIG. 4(a) is said to encompass all variations of said pattern in which the column and/or the row are displaced in relation to one another. As, a result, the pattern shown in FIG. 4(b) and the pattern shown in FIG. 4(c) both fall within the category of the decoupled pattern shown in FIG. 4(a). As can be appreciated, the identification of decoupled patterns are particularly useful for fault analysis engineers to identify the cause of faulty memory cells.

Once the user has defined the particular characteristics of the fault analysis to be performed in the fault shape analysis order, fault shape analyzer 15 extracts said information from tables 25, 29 and 31 and performs the fault analysis function using bitmap test data 13. It should be noted that set-up interface 21 allows the user to submit multiple fault shape analysis orders at one time, the sequence of execution of said fault shape analysis orders being controlled, if desired, by the user.

It should be noted that the particular method by which fault shape analyzer 15 identifies user-specified fault patterns within the user-specified sub-array of a memory device serves as the principal feature of the present invention and will be discussed further in detail below.

Method for Analyzing a Bitmap Display for a User-specified Failure Pattern

Figure 5:
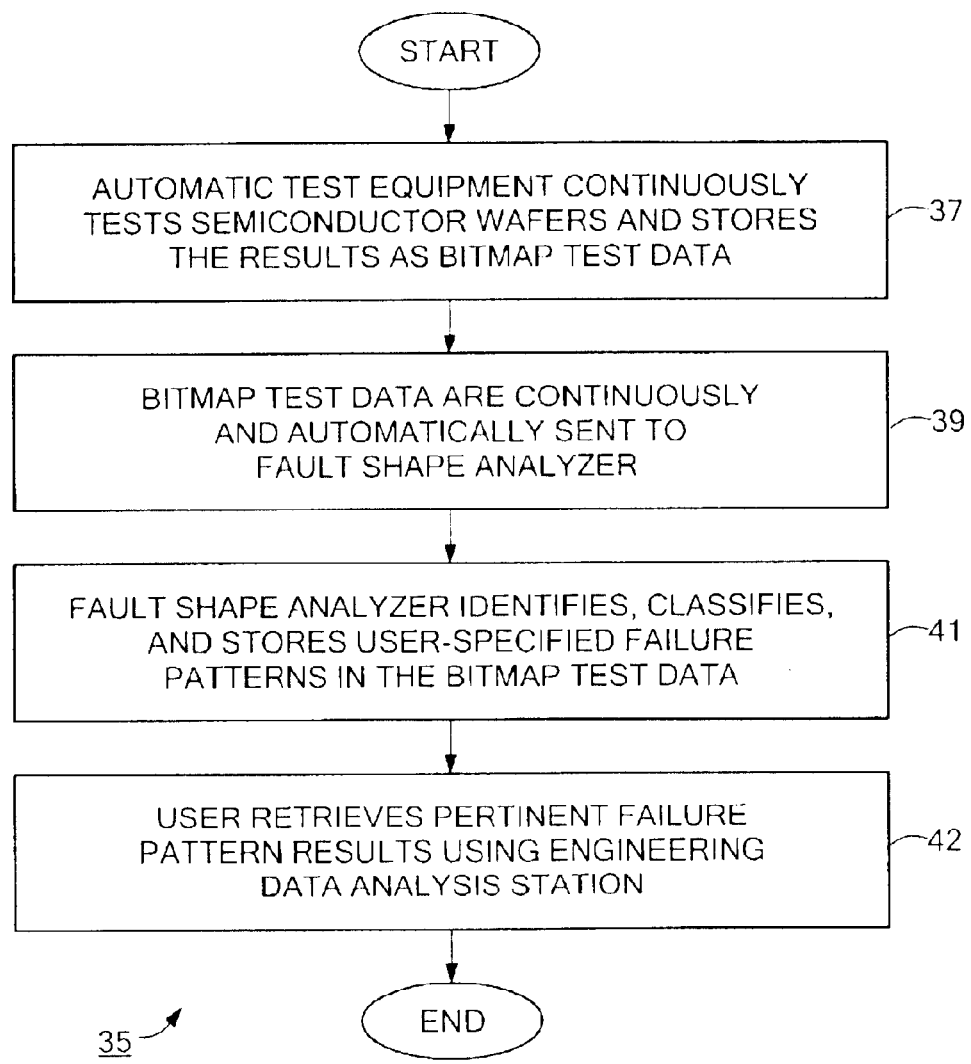
FIG. 5 is a flow chart of a method for analyzing a bitmap display for a user-specified failure pattern, said method specified according to the teachings of the present invention.

Referring now to FIG. 5, there is shown a flow chart depicting the method in which system 11 can be used to analyze and store failure patterns in bitmap displays, said method being identified generally by reference numeral 35.

As noted above, automatic test equipment continuously performs bitmap tests on the desired semiconductor wafers, said step represented by reference numeral 37. During step 37, the raw bitmap test data generated by automatic test equipment are grouped into various bitmap test data 13. It should be noted that test data 13 provide test result data in relation to particular logical (memory) addresses of memory devices on each semiconductor wafer tested.

Having created bitmap test data 13 in step 37, bitmap test data 13 are continuously and automatically uploaded into fault shape analyzer 15, said step being represented by reference numeral 39.

With bitmap test data 13 uploaded, fault shape analyzer 15 identifies and classifies failure patterns, as defined by the user, using bitmap test data 13, said step being identified generally by reference numeral 41. In step 41, the failure patterns identified by FSA 15 are stored as defect files in database 17.

Once defect files are downloaded into database 17, the user is able to retrieve pertinent defect pattern results through EDA station 19, as represented by reference numeral 42. In particular, EDA station 19, enables the user to more closely examine the cause of the failure of certain memory cells, which is highly desirable.

As noted briefly above, the method in step 41 by which fault shape analyzer 15 identifies and classifies failure patterns, as defined by the user, and stores said failure patterns as defect files in database 17 serves as the principal novel feature of the present invention.

Method for Identifying Failure Patterns in a Bitmap Display

Figure 6:
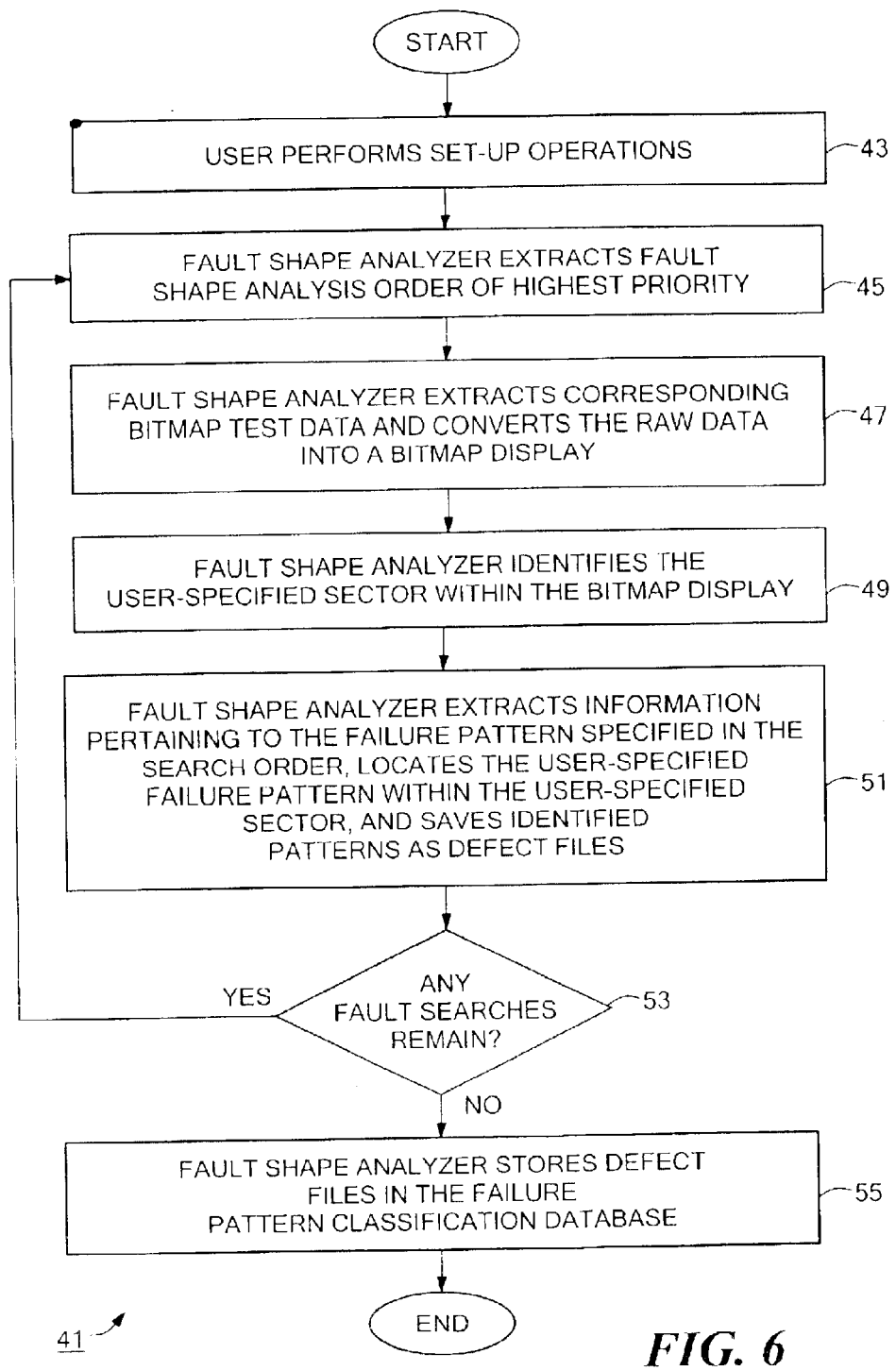
FIG. 6 is a flow chart depicting in greater detail the step of identifying failure patterns shown in FIG. 5.

Referring now to FIG. 6, a detailed flowchart depicting the method in step 41 by which fault shape analyzer 15 identifies and classifies failure patterns, as defined by the user, and stores said failure patterns as defect files in database 17 is shown. In the primary step, as represented by reference numeral 43, the user performs the set-up operations using interface 21. Specifically, in step 43, the user establishes a sequence of fault shape analysis orders to be performed by fault shape analyzer 15. Each fault shape analysis order created in step 43 specifies: (1) the particular search area to be examined (i.e., which particular sub-array of which memory device of which semiconductor is to be examined) and (2) the particular failure pattern to be located within the search area (i.e., the shape and type of failure pattern). The sequence of fault shape analysis orders are saved as a search file.

After the user performs the necessary set-up operations in step 43, fault shape analyzer 15 extracts the fault shape analysis order of the highest remaining priority from the search file, said step being represented generally by reference numeral 45.

Having extracted the fault shape analysis order of the highest remaining priority, fault shape analyzer 15 extracts the bitmap test data 13 corresponding to the particular wafer identified by the user and converts the raw data 13 into a bitmap display of said wafer, as represented generally by reference numeral 47. Specifically, the fault shape analyzer 15 takes the raw data 13 which is grouped according to logical addresses and constructs a bitmap display matrix for each die, the bitmap matrix enabling the user to determine the spatial relation of each bit within the memory device. Each bit shown in the bitmap matrix is assigned a value and a color shading based on its functionality (e.g., in the drawings, a failed bit is given a value of +1 and is represented as a white box with solid diagonal lines and a passed bit is given a value of −1 and is represented as a white box).

Having created a bitmap display matrix in step 47, fault shape analyzer 15 identifies the specific sub-array, or sector, of the matrix of which the user specified in the particular fault shape analysis order, said step being represented by reference numeral 49. Specifically, the fault shape analyzer 15 identifies the rectangular, user-specified search area within the bitmap matrix, as defined by its rows and columns, which was requested in the fault shape analysis order.

With the search area of the memory device identified, fault shape analyzer 15 then performs the user-specified fault shape analysis for the search area, said step being identified by reference numeral 51. As will be described further in detail below, the fault shape analysis process performed by FSA 15 is accomplished by (1) extracting the user-specified failure pattern to be searched, (2) identifying the user-specified failure pattern in the defined search area, and (3) saving the classification and location data for those failure patterns identified within the defined search area as defect files.

Having completed the fault shape analysis order in step 51, the fault shape analyzer 15 then determines whether any additional fault shape analysis orders remain in the search file, as represented by reference numeral 53.

If additional fault shape analysis orders remain in the search file, the process returns to step 45, wherein the FSA 15 extracts the next fault shape analysis order as listed sequentially in the search file, and steps 47, 49 and 51 repeat using the information from said next order. The process repeats, as necessary, until all of the search orders in the search file are executed.

If no additional fault shape analysis orders remain in the search file, fault shape analyzer 15 stores the defect files accumulated from step 51 in failure pattern classification database 17, said step being represented by reference numeral 55. It should be noted that the data pertaining to the identified fault shapes are stored in database 17 in both the bitmap domain and the layout, or spatial, domain, which is highly desirable.

It should be known that novel aspect of the present invention relates, in particular, to the particular method in step 51 by which fault shape analyzer 15 locates user-specified fault shapes within the requested sub-array of the bitmap matrix. Specifically, a principal novel feature of the present invention relates to the fact that fault shape analyzer 15 identifies in the frequency domain the user-specified fault shapes in the bitmap matrix, as will be described further in detail below.

Fault shape analyzer 15 executes the method of step 51 using one of three different processes. The particular process to be utilized by FSA 15 during the execution of step 51 is dependent upon the type of fault shape that requires searching. Specifically, a first method is used to perform step 51 when the user-specified fault shape is a deterministic fault shape, a second method is used to perform step 51 when the user-specified fault shape is a non-deterministic fault shape and a third method is used to perform step 51 when the user-specified fault shape is a decoupled fault shape (the third method always being used for decoupled fault shapes regardless of the fact that a decoupled fault shape includes deterministic and/or non-deterministic characteristics). Each of said three methods will be described in turn herein.

Method for Identifying Deterministic Failure Patterns

Figure 7:
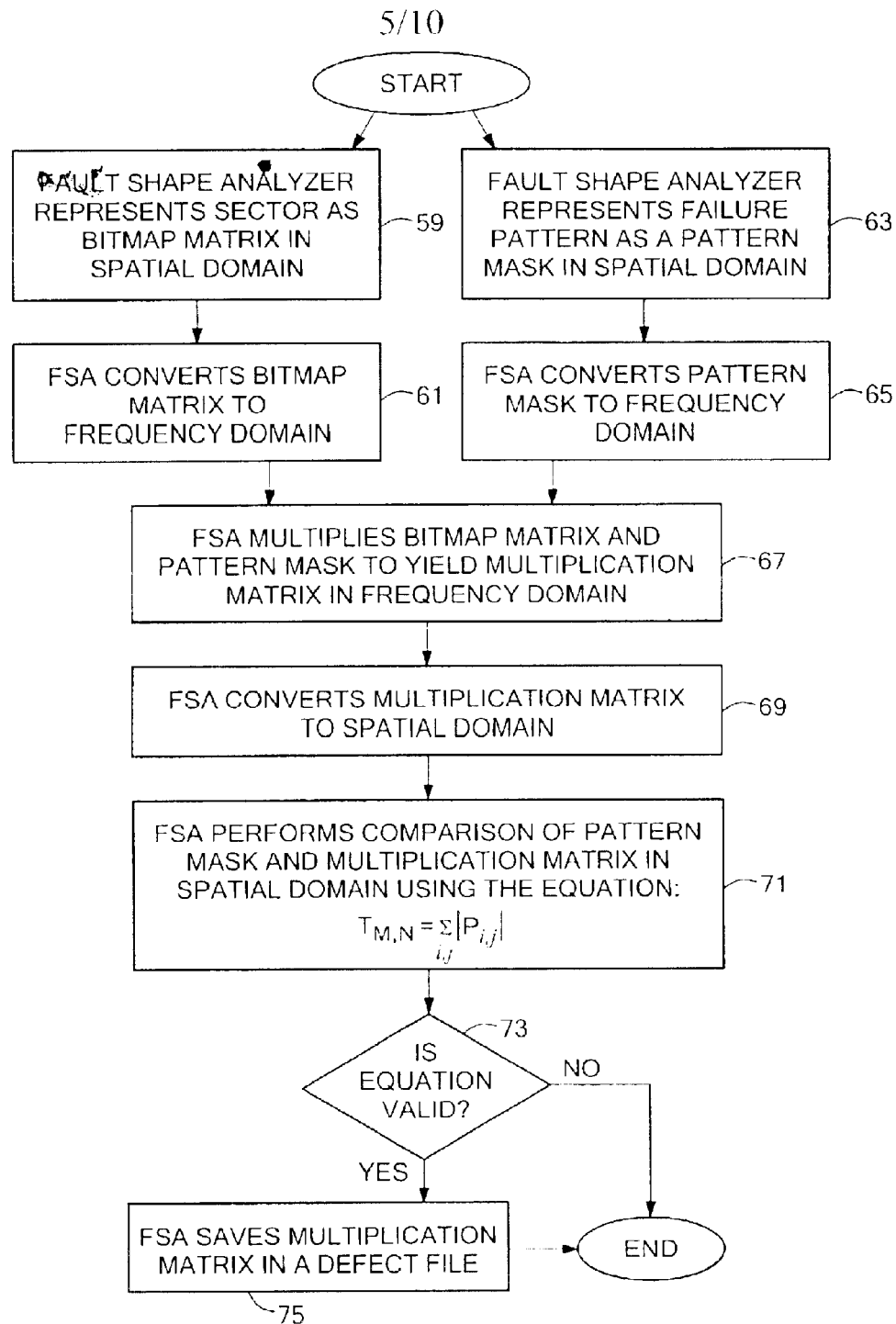
FIG. 7 is a flow chart of a method for analyzing deterministic failure patterns specified according to the teachings of the present invention.

Referring now to FIG. 7, there is shown a flow chart depicting a first method for executing step 51. Namely, there is shown a method for identifying deterministic fault shapes within a desired sector of a bitmap display matrix, said method being identified generally by reference numeral 57.

Method 57 begins with fault shape analyzer 15 representing the user-specified sector, or sub-array, of the memory device to be examined as a bitmap matrix in the spatial domain, said step being represented generally by reference numeral 59. It should be noted that FSA 15 designates each bit (i.e., memory cell) to a block within the matrix, each bit being assigned a value based on its functionality (i.e., +1 for a failed bit and −1 for a passed bit). For simplicity purposes only, the bitmap matrix in the spatial domain will be referred to herein as $S_{i,j}$, where i and j represent a row and column coordinate system of the bitmap matrix.

Having represented the bitmap matrix in the spatial domain in step 59, fault shape analyzer 15 converts the bitmap matrix from the spatial domain to the frequency domain, said step being represented generally by reference numeral 61. Specifically, fault shape analyzer 15 performs a Fourier Transform of the bitmap matrix in the spatial domain to create the bitmap matrix in the frequency domain. For simplicity purposes only, the bitmap matrix in the frequency domain will be referred to herein as $S'_{i,j}$.

While step 59 is being executed, fault shape analyzer 15 simultaneously represents the user-specified failure pattern as a pattern mask in the spatial domain, said step being represented generally by reference numeral 63. It should be noted that FSA 15 assigns each bit of the pattern mask a value based on its functionality (i.e., +1 for a failed bit, −1 for a passed bit, and 0 for inconsequential, "don't care" bits). For simplicity purposes only, the pattern mask in the spatial domain will be referred to herein as $P_{i,j}$, where i and j represent a row and column coordinate system for the pattern mask.

Having represented the pattern mask in the spatial domain in step 63, fault shape analyzer 15 converts the pattern mask from the spatial domain to the frequency domain, said step being represented generally by reference numeral 65. Specifically, fault shape analyzer 15 performs a Fourier Transform of the pattern mask in the spatial domain to create the pattern mask in the frequency domain. For simplicity purposes only, the pattern mask in the frequency domain will be referred to herein as $P'_{i,j}$.

After having completed steps 61 and 65, fault shape analyzer 15 multiplies together, in a bit by bit manner, the bitmap matrix in the frequency domain and the pattern mask in the frequency domain, said step being represented by reference numeral 67. The multiplication in the frequency domain of the bitmap matrix and the pattern mask generates a multiplied matrix in the frequency domain. As will be discussed further below, the multiplied matrix can be used to identify the user-specified pattern mask in the bitmap matrix. For simplicity purposes only, the multiplied matrix in the frequency domain will be referred to herein as $T'_{i,j}$.

Having generated the multiplied matrix in the frequency domain in step 67, fault shape analyzer 15 then converts the multiplied matrix from the frequency domain to the spatial domain, said step being represented generally by reference numeral 69. Specifically, fault shape analyzer 15 performs an inverse Fourier Transform of the multiplied matrix in the frequency domain to create the multiplication matrix in the spatial domain. For simplicity purposes only, the multiplication matrix in the spatial domain will be referred to herein as $T_{i,j}$.

The multiplied matrix in the spatial domain created in step 69 can be used to locate the pattern mask within the bitmap matrix, said step being identified as step 71. Specifically, the pattern mask is said to be identified, or located, at a location (M,N) of the bitmap matrix only when the multiplication matrix in the spatial domain, $T_{i,j}$, is directly matched (i.e., equal to) with the pattern mask in the spatial domain, $P_{i,j}$. The following equation can be used to determine direct matching at a location (M,N) between the multiplication matrix in the spatial domain and the pattern mask in the spatial domain:

$$T_{M,N} = \sum_{i,j} |P_{i,j}|$$

Fault shape analyzer 15 inputs the particular values of the algorithm identified above in step 71. Fault shape analyzer 15 then analyzes whether the algorithm identified in step 71 was met. In other words, fault shape analyzer 15 determines whether the bitmap matrix at location (M,N) matches the pattern mask, said step being identified by reference number 73.

If the algorithm identified in step 71 is satisfied at location (M,N), a defect will be generated with pattern and location information and the defect will be saved to the defect file, as represented by reference number 75. As such, the multiplied pattern (which identifies the particular failure pattern located in the bitmap matrix) is stored in database 17 for future analysis. After completion of step 75, method 57 terminates.

If the algorithm identified in step 71 is not satisfied at any location, nothing will be saved to the defect file and method 57 terminates.

It should be noted that multiplying the bitmap matrix and the pattern mask in the frequency domain (i.e., step 67) can be performed using very efficient algorithms. To the contrary, finding patterns matching the pattern mask in the bitmap matrix in the spatial domain can only be performed using very complex and inefficient algorithms. As a result, performing the multiplication step in the frequency domain can be achieved at a far greater speed than matching patterns in the spatial domain. Specifically, the time $T_1$ required to perform the multiplication of the bitmap matrix and the pattern mask in the frequency domain would be in the order of: $T_1=O(MN\log(MN))$, whereas the time $T_2$ required to find patterns matching the pattern mask in the bitmap matrix in the spatial domain would be in the order of: $T_2=O(M^2N^2)$, $T_2$ being far greater in magnitude than $T_1$. As such, the entire process for analyzing bitmap test data for failure patterns by multiplying the bitmap matrix and the pattern mask in frequency domain can be performed at a far greater speed (approximately 1 semiconductor wafer per 30 minutes) than the entire process for analyzing bitmap test data for failure patterns by finding patterns in the bitmap matrix in the spatial domain (approximately 1 semiconductor wafer per 24 hours), which is highly desirable.

For greater understanding of method 57, a detailed example is described herein. Specifically, referring now to FIG. 8, there is shown a pattern mask definition $P_{i,j}$ and a bitmap matrix $S_{i,j}$ in which the pattern mask definition $P_{i,j}$ is to be searched (wherein a white cell with diagonal lines represents a fail bit; a pure white cell represents a pass bit; and a white cell with horizontal dashed lines represents an insignificant, or don't care, bit).

Intuitively, the process of finding pattern mask definition $P_{i,j}$ within bitmap matrix $S_{i,j}$ involves a bit-by-bit comparison. Specifically, starting with the upper-left corner of bitmap matrix $S_{i,j}$ pattern mask definition $P_{i,j}$ is overlaid onto the bitmap matrix $S_{i,j}$ and the bitmap matrix $S_{i,j}$ and the pattern mask $P_{i,j}$ are compared for each bit of bitmap matrix $S_{i,j}$. If the pattern mask $P_{i,j}$ and the bitmap matrix $S_{i,j}$ match exactly at a location (M,N) of the bitmap matrix $S_{i,j}$, a pattern match is determined. As can be readily appreciated, in FIG. 8 there are exactly two matches of pattern mask $P_{i,j}$ in bitmap matrix $S_{ij}$.

However, the process of locating a pattern mask in a bitmap matrix in a bit-by-bit fashion is inefficient when the bitmap matrix and the pattern mask include a large number of bits.

Accordingly, method 57 solves this problem by replacing the bit-by-bit matching method described above with a convolution process which can be computed efficiently using fast Fourier Transform. In order to use the convolution technique, the process of bit-by-bit matching is replaced with a sum of products computation.

Figures 8, 9:
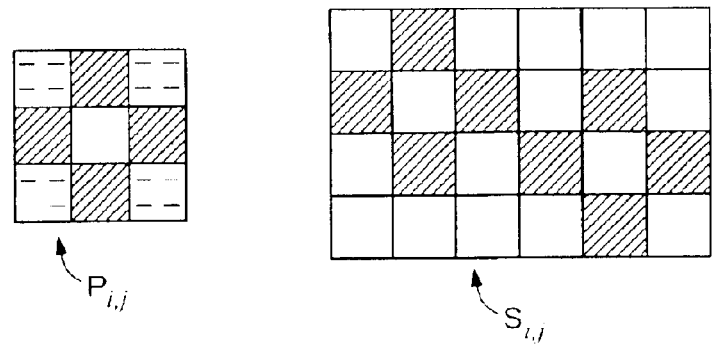
FIG. 8 is an example of a pattern mask definition and a bitmap matrix which can be matched together using the method of FIG. 7, each bit of the pattern mask definition and the bitmap matrix being assigned a pattern corresponding to the functionality of said bit.
FIG. 9 shows the pattern mask definition and the bitmap matrix of FIG. 8, the convolution product of the pattern mask definition and the bitmap matrix also being shown, each bit of the pattern mask definition and the bitmap matrix being assigned a numerical value corresponding to the functionality of said bit.

Specifically, referring now to FIG. 9, each bit of bitmap matrix $S_{i,j}$ and pattern mask $P_{i,j}$ is assigned a value. Specifically, for the pattern mask $P_{i,j}$, each fail bit is assigned a value of +1, each insignificant bit is assigned a value of 0, and each pass bit is assigned a value of −1. For the bitmap matrix $S_{i,j}$ each fail bit is assigned a value of +1 and each pass bit is assigned a value of −1 (note that in the bitmap matrix $S_{i,j}$ all bits are either fail or pass bits).

If the sum of the product of the pattern mask $P_{i,j}$ and the bitmap matrix $S_{i,j}$ at location (M,N) of bitmap matrix $S_{i,j}$ equals the total number of non-zero bits in the pattern mask $P_{i,j}$, then it is determined that pattern mask $P_{i,j}$ is matched at location (M,N) of the bitmap matrix $S_{i,j}$. Specifically, the total number of non-zero bits for the pattern mask $P_{i,j}$ of FIG. 9 is 5. The convolution of pattern mask $P_{i,j}$ and the bitmap matrix $S_{i,j}$ is represented by convolution matrix T. As such, it is apparent that there are exactly two locations in the convolution matrix T which match the total number of non-zero bits for the pattern mask $P_{ij}$ (i.e., 5). As a result, it has been determined that there are two matches of the pattern mask $P_{i,j}$ within the bitmap matrix $S_{i,j}$, the location of each match being shown where the convolution matrix T displays a bit having a value of 5.

Method for Identifying Non-deterministic Failure Patterns

Figure 10:
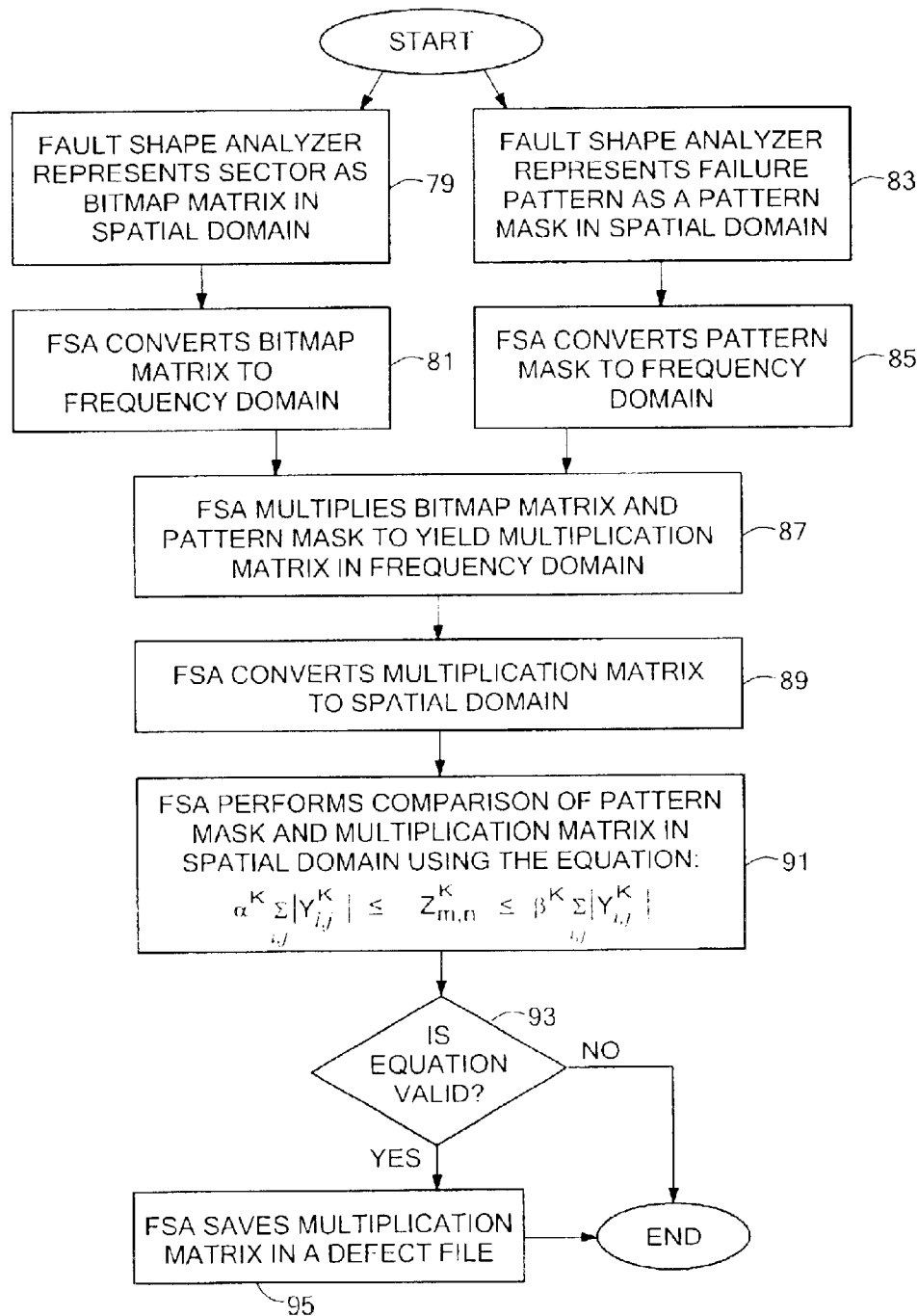
FIG. 10 is a flow chart of a method for analyzing non-deterministic failure patterns specified according to the teachings of the present invention.

Referring now to FIG. 10, there is shown a flow chart depicting a second method for executing step 51. Namely, there is shown a method for identifying non-deterministic fault shapes within a desired sector of a bitmap display matrix, said method being identified generally by reference numeral 77. As can be appreciated, method 57 is to be executed by fault shape analyzer 15 to identify deterministic fault shapes and method 77 is to be executed by fault shape analyzer 15 to identify non-deterministic fault shapes.

Method 77 is similar to method 57 in that method 77 also begins with fault shape analyzer 15 representing the user-specified sector, or sub-array, of the memory device to be examined as a bitmap matrix in the spatial domain, said step being represented generally by reference numeral 79. It should be noted that FSA 15 designates each bit (i.e., memory cell) to a block within the matrix, each bit being assigned a value based on its functionality (i.e., 1 for a failed bit and 0 for a passed bit). For simplicity purposes only, the bitmap matrix in the spatial domain will be referred to herein as $X_{i,j}$, where i and j represent a row and column coordinate system of the bitmap matrix.

Having represented the bitmap matrix in the spatial domain in step 79, fault shape analyzer 15 converts the bitmap matrix from the spatial domain to the frequency domain, said step being represented generally by reference numeral 81. Specifically, fault shape analyzer 15 performs a Fourier Transform of the bitmap matrix in the spatial domain to create the bitmap matrix in the frequency domain. For simplicity purposes only, the bitmap matrix in the frequency domain will be referred to herein as $X'_{i,j}$.

While step 79 is being executed, fault shape analyzer 15 simultaneously represents the user-specified failure pattern as a pattern mask in the spatial domain, said step being represented generally by reference numeral 83. It should be noted that FSA 15 assigns each bit of the pattern mask a value based on its location (i.e., 1 for each bit within the base shape and 0 for each bit outside the base shape). For simplicity purposes only, the pattern mask in the spatial domain will be referred to herein as $Y_{i,j}$, where i and j represent a row and column coordinate system for the pattern mask.

Having represented the pattern mask in the spatial domain in step 83, fault shape analyzer 15 converts the pattern mask from the spatial domain to the frequency domain, said step being represented generally by reference numeral 85. Specifically, fault shape analyzer 15 performs a Fourier Transform of the pattern mask in the spatial domain to create the pattern mask in the frequency domain. For simplicity purposes only, the pattern mask in the frequency domain will be referred to herein as $Y'_{i,j}$.

After having completed steps 81 and 85, fault shape analyzer 15 multiplies together, in a bit by bit manner, the bitmap matrix in the frequency domain and the pattern mask in the frequency domain, said step being represented by reference numeral 87. The multiplication in the frequency domain of the bitmap matrix and the pattern mask generates a multiplied matrix in the frequency domain. As will be discussed further below, the multiplied matrix can be used to identify the user-specified pattern mask in the bitmap matrix. For simplicity purposes only, the multiplied matrix in the frequency will be referred to herein as $Z'_{i,j}$.

Having generated the multiplied matrix in the frequency domain in step 87, fault shape analyzer 15 then converts the multiplied matrix from the frequency domain to the spatial domain, said step being represented generally by reference numeral 89. Specifically, fault shape analyzer 15 performs an inverse Fourier Transform of the multiplied matrix in the frequency domain to create the multiplication matrix in the spatial domain. For simplicity purposes only, the multiplication matrix in the spatial domain will be referred to herein as $Z_{i,j}$.

The multiplied matrix in the spatial domain created in step 69 can be used to locate the pattern mask within the bitmap matrix, said step being identified as step 91. Specifically, the pattern mask is said to be identified, or located, at a location (M,N) of the bitmap matrix only when the multiplication matrix in the spatial domain, $Z_{i,j}$, falls within the user-specified, percent failure range defined by the pattern mask in the spatial domain, $Y_{i,j}$. In other words, for a user-defined pattern mask in the spatial domain $Y_{i,j}$ having a failure range between a (lower bound percentage) and β (upper bound percentage), and wherein K refers to the $K^{th}$ base shape (i.e., the number of base shapes) in the pattern mask definition $Y_{i,j}$, the following equation can be used to determine a match at a location (M,N) between the multiplication matrix in the spatial domain and the pattern mask in the spatial domain:

$$\alpha^K \sum_{i,j} |Y_{i,j}^K| \le Z_{M,N}^K \le \beta^K \sum_{i,j} |Y_{i,j}^K|$$

Fault shape analyzer 15 inputs the particular values of the algorithm identified above in step 91. Fault shape analyzer 15 then analyzes whether the algorithm identified in step 91 was met. In other words, fault shape analyzer 15 determines whether the bitmap matrix at location (M,N) matches the pattern mask, said step being identified by reference number 93.

If the algorithm identified in step 91 is met (i.e., the bitmap matrix in the spatial domain at location (M,N) matches the conditions defined by the pattern mask), a defect will be generated with pattern and location information, and the defect is saved to a defect file, as represented by reference number 75. As such, the found pattern (which identifies the particular failure pattern located in the bitmap matrix) is stored in database 17 for future analysis. After completion of step 95, method 77 terminates.

If the algorithm identified in step 91 is not satisfied at any location, nothing is saved to a defect file and method 77 terminates.

It should be noted that multiplying the bitmap matrix and the pattern mask in the frequency domain (i.e., step 87) can be performed using very efficient algorithms. To the contrary, finding patterns in the bitmap matrix in the spatial domain can only be performed using very complex and inefficient algorithms. As a result, performing the multiplication step in the frequency domain can be achieved at a far greater speed than performing the convolution step in the spatial domain. Specifically, the time $T_1$ required to perform the multiplication of the bitmap matrix and the pattern mask in the frequency domain would be in the order of: $T_1 = O(KMN \cdot \log(MN))$, whereas the time $T_2$ required to perform the finding of patterns in the bitmap matrix in the spatial domain would be in the order of: $T_2 = O(M^2N^2)$, $T_2$ being far greater in magnitude than $T_1$.

For greater understanding of method 77, a detailed example is described herein. Specifically, referring now to FIG. 11, there is shown a pattern mask definition $Y_{i,j}$ and a bitmap matrix $X_{i,j}$ in which the pattern mask definition $Y_{i,j}$ is to be searched.

A non-deterministic pattern mask (such as $Y_{i,j}$) contains partial failure blocks. A partial failure block defines a region of bits having a total number of failures within a specified range. For example, pattern mask $Y_{i,j}$ in FIG. 11 has a lower bound range α of failed bits of 3 and an upper bound range β of failed bits of 4. It is important to note that each individual bit within the region of a partial failure block cannot be determined as a pass or fail bit in advance.

In order to apply the convolution technique of method 77, each bit of pattern mask $Y_{i,j}$ and bitmap matrix $X_{i,j}$ is assigned a numeric value. Specifically, for pattern mask $Y_{i,j}$, each bit within the partial failure block is assigned a value of +1 and each bit outside of the partial failure block is assigned a value of 0. (As such, it is apparent that every bit in the pattern mask $Y_{i,j}$ shown in FIG. 11 is located within the partial failure block.) For the bitmap matrix $X_{i,j}$, each fail bit is assigned a value of +1 and each pass bit is assigned a value of 0.

The sum of the product of the pattern mask $Y_{i,j}$ and the bitmap matrix $X_{i,j}$ is represented by matrix Z in FIG. 11. If the lower bound range α of failed bits for the partial block of the pattern mask $Y_{i,j}$ is 33% (3 bits) and the upper bound range β of failed bits for the partial block of the pattern mask $Y_{i,j}$ is 44% (4 bits), a match is found at location (M,N) of convolution product Z only if the value at said location falls between the lower bound range (i.e., 3) and the upper bound range (i.e., 4). As such, it is apparent that there are exactly four locations in the convolution matrix Z which fall within the lower bound and upper bound range. As a result, it has been determined that there are exactly four matches of the pattern mask $Y_{i,j}$ within the bitmap matrix $X_{i,j}$, the location of each match being shown where the convolution matrix Z displays a bit having a value of 3 or 4.

It should be noted that the example described above can be enhanced to include more than one partial block in the pattern mask. Specifically, if one were to assume that the non-deterministic pattern mask contains K partial blocks, the size of partial block k is $Z_k$ (where k is between 1 and K), the upper bound range of partial block k is $U_k$, the lower bound range of partial block k is $L_k$, $V_k = V_{k-1} \cdot (Z_{k-1} + 1)$, $V_0 = 1$, and $Z_0 = 0$, then following holds true. For the pattern mask, if a bit does not belong to any partial block, said bit is assigned a value of 0, if a bit belongs to only one partial block k, said bit is assigned a value of $V_k$, and if a bit belongs to multiple partial blocks, said bit is assigned a value which is equal to the sum of all the $V_k$ values for each partial block it belongs to. Furthermore, for the bitmap matrix, each failed bit is assigned a value of 1 and each passed bit is assigned a value of 0.

Accordingly, if convolution matrix Z equals the sum of products of the pattern mask and the bitmap matrix at location (M,N), pattern mask is said to be matched at location (M,N) of bitmap matrix if and only if the following condition is satisifed:

For each partial block k, let $S_k = MOD(MOD( \ldots MOD(S, Z_K) \ldots ), Z_{k+2}), Z_{k+1})/Z_k$, the $S_k$ should fall between $L_k$ and $U_k$ for every k.

Method for Identifying Decoupled Failure Patterns

Figure 12:
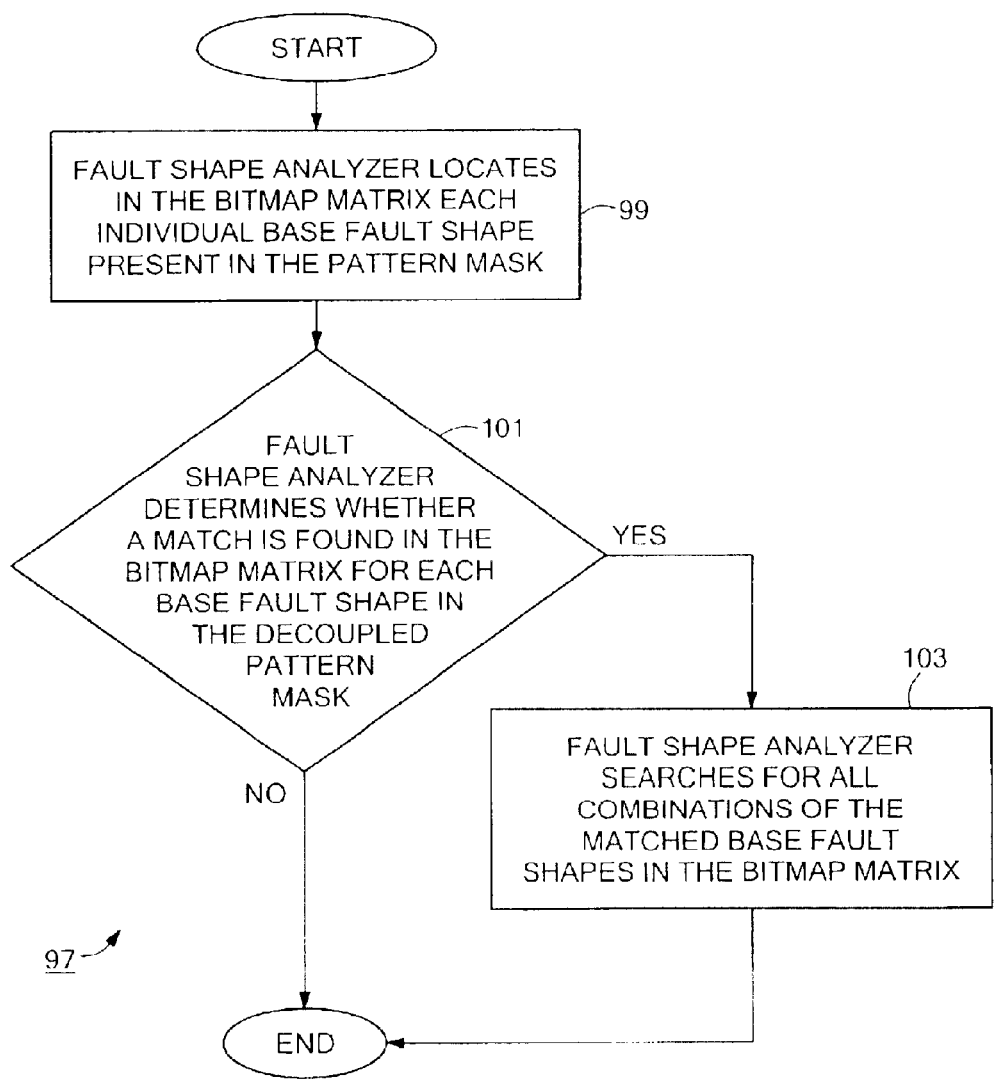
FIG. 12 is a flow chart of a method for analyzing decoupled failure patterns specified according to the teachings of the present invention.

Referring now to FIG. 12, there is shown a flow chart depicting a third method for executing step 51. Namely, there is shown a method for identifying decoupled fault shapes within a desired sector of a bitmap display matrix, said method being identified generally by reference numeral 97. As can be appreciated, method 97 is to be executed by fault shape analyzer 15 to identify decoupled fault shapes.

As noted briefly above, a decoupled pattern includes multiple base shapes, each base shape being either of the deterministic or non-deterministic type. Each base shape of a decoupled pattern is not fixed in the position in which it is defined. Instead, each base shape can move freely relative to the other base shapes as long as each base shape remains within the same pattern mask definition.

As an example, FIGS. 13(a) depicts a decoupled row and column (RAC) pattern. Because the pattern in FIG. 13(a) is a decoupled pattern, the base shapes (i.e., the row and column marked with solid diagonal lines) can move freely relative to each other so long as each base shape remains on the pattern mask, as can be seen in FIGS. 13(b) and 13(c). In this capacity, a decoupled pattern includes a large number of combinations.

As another example, FIG. 14(a) depicts a decoupled bit pattern. Because the pattern in FIG. 14(a) is a decoupled pattern, the base shapes (i.e., four individual fail bits) can move freely relative to each other so long as each base shape (i.e., bit) remains on the three-by-two bit pattern mask. As such, each of the four bits can move freely within the pattern mask in order to create many different combinations, such as the patterns shown in FIG. 14(b) and FIG. 14(c).

Due to the complex nature of decoupled fault shapes, method 97 requires more processing steps than methods 57 and 77, as will be described further below. Method 97 begins with fault shape analyzer 15 locating (i.e., matching) in the bitmap matrix each individual base shape which is present in the pattern mask, said step being represented generally by reference numeral 99. Fault shape analyzer 15 performs step 99 of identifying each base fault shape in the bitmap matrix using either method 57 or method 77. Specifically, if the base fault shape to be identified in the bitmap matrix is a deterministic failure pattern, method 57 is performed. To the contrary, if the base fault shape to be identified in the bitmap matrix is a non-deterministic failure pattern, method 77 is performed. If the decoupled pattern mask definition includes the number K of base fault shapes and if the coordinate size of the bitmap matrix is (M,N), the time complexity of performing step 99 is O(KMN·Log(MN)).

An example of step 99 is described briefly herein. Specifically, as noted above, FIG. 13(a) depicts a decoupled row and column (RAC) failure pattern mask. FIG. 15 depicts a bitmap matrix. If fault shape analyzer 15 were to locate in the bitmap matrix shown in FIG. 15 the decoupled pattern mask shown in FIG. 13(a), fault shape analyzer would first (in step 99) locate each base fault shape (namely, a deterministic row and a deterministic column) from the failure pattern mask of FIG. 13(a) in the bitmap matrix of FIG. 15. Accordingly, the deterministic row base fault shape in the decoupled pattern mask would be matched three times in the bitmap matrix and the deterministic column base fault shape in the decoupled pattern mask would be matched twice in the bitmap matrix.

If the decoupled pattern mask definition includes the number K base shapes, the number of signals (i.e., matches) detected for the base shape k can be represented as $S_k$. Accordingly, fault shape analyzer 15 determines whether a match is found in the bitmap matrix for each base fault shape in the decoupled pattern mask, said step being represented by reference number 101.

If, in step 101, fault shape analyzer 15 determines that the number of matches detected for any base shape is zero (i.e., $S_k$ equals zero), method 97 terminates because no decoupled fault patterns are present in the bitmap matrix.

If, in step 101, fault shape analyzer 15 determines that the number of matches detected for each base fault shape is equal to or greater than 1 (i.e., $S_K \geq 1$), method 97 continues to step 103.

In step 103, fault shape analyzer 15 performs an exhaustive search of all combinations of the matched base fault shapes in the bitmap matrix. If a combination of each base fault shape is found to be bound within the same pattern mask, a match is deemed found in the bitmap matrix. The time complexity of performing step 103 is $$O\left(\prod_k O_k\right).$$

Using the example described above, six combinations of the decoupled row and column (RAC) failure pattern mask in FIG. 13(a) would be located within the bitmap matrix shown in FIG. 15. However, using the destructive search principle, only two combinations are saved as matching patterns.

As noted above, method 97 is more complex in nature than methods 57 and 77. Specifically, where K equals the total number of base shapes in the pattern mask, the total processing time for method 97 can represented as $$O(KMN \cdot \log(MN)) + O\left(\prod_k O_k\right).$$

The embodiment shown of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method for analyzing bitmap test data, said method comprising the steps of:
   (a) establishing a first failure pattern analysis order to be performed, the first failure pattern analysis order specifying a particular failure pattern to be identified, the failure pattern having at least one base fault shape,
   (b) converting said bitmap test data into a bitmap display based on the first failure pattern analysis order, and
   (c) identifying in the frequency domain the failure pattern of the first failure pattern analysis order in said bitmap display.

2. The method of claim 1 wherein said failure pattern analysis order specifies the particular sector within said bitmap display for which said identification step is to be performed.

3. The method of claim 1 further comprising the step of establishing a second failure pattern analysis order to be performed, the second failure pattern analysis order specifying a particular failure pattern to be identified.

4. The method of claim 3 wherein said first and second failure pattern analysis orders are ranked in terms of priority, the failure pattern analysis order of higher priority being performed before the failure pattern analysis order of lower priority.

5. The method of claim 1 further comprising the step of, upon completion of said identification step, storing failure patterns identified in said bitmap display in a defect file.

6. The method of claim 1 wherein, if the failure pattern specified in said first failure pattern analysis order is deterministic, said identification step comprises the step of:
   (a) representing the sector of the bitmap display specified in the first failure pattern analysis order as a bitmap matrix in the spatial domain,
   (b) converting said bitmap matrix from the spatial domain to the frequency domain,
   (c) representing the failure pattern specified in the first failure pattern analysis order as a pattern mask in the spatial domain,
   (d) converting said pattern mask from the spatial domain to the frequency domain,
   (e) multiplying together the bitmap matrix in the frequency domain and the pattern mask in the frequency domain to yield a multiplication matrix in the frequency domain,
   (f) converting said multiplication matrix in the frequency domain to the spatial domain, and
   (g) calculating whether said multiplication matrix in the spatial domain directly matches the pattern mask in the spatial domain.

7. The method of claim 6 wherein said step of converting said bitmap matrix from the spatial domain to the frequency domain is accomplished by performing a Fourier Transform on said bitmap matrix in the spatial domain to yield the bitmap matrix in the frequency domain.

8. The method of claim 6 wherein said step of converting said pattern mask from the spatial domain to the frequency domain is accomplished by performing a Fourier Transform on said pattern mask in the spatial domain to yield the pattern mask in the frequency domain.

9. The method of claim 6 wherein said step of converting said multiplication matrix from the frequency domain to the spatial domain is accomplished by performing an inverse Fourier Transform on said multiplication matrix in the frequency domain to yield the multiplication matrix in the spatial domain.

10. The method of claim 6 wherein said calculation step is accomplished using the following equation:

$$T_{M,N} = \sum_{i,j} |P_{i,j}|$$

where i and j represent the coordinate system of the bitmap matrix and the pattern mask, T represents the multiplication mask in the spatial domain, P represents the pattern mask in the spatial domain, and M and N represent the particular coordinates on the bitmap matrix which are being analyzed.

11. The method of claim 10 wherein, if in said calculation step the equation is satisfied for location (M,N), a defect with pattern and location information will be generated and will be saved to a defect file.

12. The method of claim 1 wherein, if the failure pattern specified in said first failure pattern analysis order is non-deterministic, said identification step comprises the step of:
   (a) representing the sector of the bitmap display specified in the first failure pattern analysis order as a bitmap matrix in the spatial domain,
   (b) converting said bitmap matrix from the spatial domain to the frequency domain,
   (c) representing the failure pattern specified in the first failure pattern analysis order as a pattern mask in the spatial domain,
   (d) converting said pattern mask from the spatial domain to the frequency domain,
   (e) multiplying together the bitmap matrix in the frequency domain and the pattern mask in the frequency domain to yield a multiplication matrix in the frequency domain,
   (f) converting said multiplication matrix in the frequency domain to the spatial domain, and
   (g) calculating whether said multiplication matrix in the spatial domain falls within the range of the pattern mask in the spatial domain as defined in the first failure pattern analysis order.

13. The method of claim 12 wherein said step of converting said bitmap matrix from the spatial domain to the frequency domain is accomplished by performing a Fourier Transform on said bitmap matrix in the spatial domain to yield the bitmap matrix in the frequency domain.

14. The method of claim 12 wherein said step of converting said pattern mask from the spatial domain to the frequency domain is accomplished by performing a Fourier Transform on said pattern mask in the spatial domain to yield the pattern mask in the frequency domain.

15. The method of claim 12 wherein said step of converting said multiplication matrix from the frequency domain to the spatial domain is accomplished by performing an inverse Fourier Transform on said multiplication matrix in the frequency domain to yield the multiplication matrix in the spatial domain.

16. The method of claim 12 wherein said calculation step is accomplished using the following equation:

$$\alpha^K \sum_{i,j} |Y_{i,j}^K| \leq Z_{M,N}^K \leq \beta^K \sum_{i,j} |Y_{i,j}^K|$$

where i and j represent the coordinate system of the bitmap matrix and the pattern mask, T represents the multiplication mask in the spatial domain, P represents the pattern mask in the spatial domain, M and N represent the particular coordinates on the bitmap matrix which are being analyzed, $\alpha$ is the lower bound percentage range for the pattern mask, $\beta$ is the upper bound percentage range for the pattern mask, and K refers to the $K^{th}$ base fault shape in the pattern mask.

17. The method of claim 16 wherein, if in said calculation step said multiplication matrix in the spatial domain directly matches the pattern mask in the spatial domain, the multiplication matrix in the spatial domain is saved as a defect file.

18. The method of claim 1 wherein, if the failure pattern specified in said first failure pattern analysis order is decoupled, said identification step comprises the step of:
   (a) identifying in the frequency domain each base fault shape of the failure pattern in the bitmap display, and
   (b) searching for all possible combinations of the base fault shapes of the failure pattern which were identified in the frequency domain in the bitmap display.

19. The method of claim 18 wherein, for each base fault shape in the decoupled failure pattern definition which is deterministic, said identification step comprises the step of:
   (a) representing the sector of the bitmap display specified in the first failure pattern analysis order as a bitmap matrix in the spatial domain,
   (b) converting said bitmap matrix from the spatial domain to the frequency domain,
   (c) representing said failure pattern as a pattern mask in the spatial domain, (d) converting said pattern mask from the spatial domain to the frequency domain, (e) multiplying together the bitmap matrix in the frequency domain and the pattern mask in the frequency domain to yield a multiplication matrix in the frequency domain, (f) converting said multiplication matrix in the frequency domain to the spatial domain, and (g) calculating whether said multiplication matrix in the spatial domain directly matches said pattern mask in the spatial domain.

20. The method of claim 18 wherein, for each base fault shape in the decoupled failure pattern definition which is non-deterministic, said identification step comprises the step of:

(a) representing the sector of the bitmap display specified in the first failure pattern analysis order as a bitmap matrix in the spatial domain, (b) converting said bitmap matrix from the spatial domain to the frequency domain, (c) representing said failure pattern as a pattern mask in the spatial domain, (d) converting said pattern mask from the spatial domain to the frequency domain, (e) multiplying together the bitmap matrix in the frequency domain and the pattern mask in the frequency domain to yield a multiplication matrix in the frequency domain, (f) converting said multiplication matrix in the frequency domain to the spatial domain, and (g) calculating whether said multiplication matrix in the spatial domain falls within the range of said pattern mask in the spatial domain as defined in the first failure pattern analysis order.

* * * * *